United States Patent [19]
Kobayashi et al.

[11] Patent Number: 5,533,413
[45] Date of Patent: Jul. 9, 1996

[54] EQUIPMENT DIAGNOSIS SYSTEM

[75] Inventors: Yasunori Kobayashi; Shin Tanabe; Tatsuo Fukuda; Masazumi Miyazawa; Hideki Imai; Moriyuki Wani, all of Tokyo, Japan

[73] Assignees: Yokogawa Electric Corporation; Mitsubishi Chemical Corporation, both of Tokyo, Japan

[21] Appl. No.: 456,968

[22] Filed: Jun. 1, 1995

[30] Foreign Application Priority Data

Jun. 30, 1994 [JP] Japan ................................ 6-149076
Mar. 22, 1995 [JP] Japan ................................ 7-062286

[51] Int. Cl.⁶ ................................................. G01N 19/00
[52] U.S. Cl. ................................................. 73/865.9
[58] Field of Search ........................... 73/865.9, 117.3

[56] References Cited

U.S. PATENT DOCUMENTS

| | | | |
|---|---|---|---|
| 4,858,224 | 8/1989 | Nakano et al. | 370/16 |
| 5,377,112 | 12/1994 | Brown et al. | 73/117.3 |
| 5,421,204 | 6/1995 | Svaty, Jr. | 73/786 |

FOREIGN PATENT DOCUMENTS

| | | | |
|---|---|---|---|
| 2208261 | 9/1982 | Germany | 73/865.9 |
| 406180270 | 6/1994 | Japan | 73/865.9 |

Primary Examiner—Richard Chilcot
Assistant Examiner—Max Noori
Attorney, Agent, or Firm—Moonray Kojima

[57] ABSTRACT

An equipment diagnosis system for diagnosing the functional state, the deterioration state, the remaining life time state, etc, of various equipment, and comprising an equipment state model portion for modelling the state of a diagnosis target equipment and for outputting information of the functional state, deterioration, remaining life time, etc, of the diagnosis target equipment on the basis of input information; stress information supply means for supplying the equipment stage model portion with appropriate information on stress which is applied to the diagnosis target equipment; comparison means for comparing information outputted from the equipment state model portion with information which is obtained on the basis of an actual maintenance result; and model correction means for correcting a parameter of the equipment state model portion on the basis of the comparison result.

8 Claims, 10 Drawing Sheets

Fig.9
| Deterioration Name | Cause |
|---|---|
| Rolling Fatigue (Fatigue Exfoliation) | Fatigue |
| Crack, Break | Overload, Overinterference |
| Seizure | Failure of Lubrication, Overload |
| Galling | Failure of Installation, Failure of Lubrication |
Fig.10
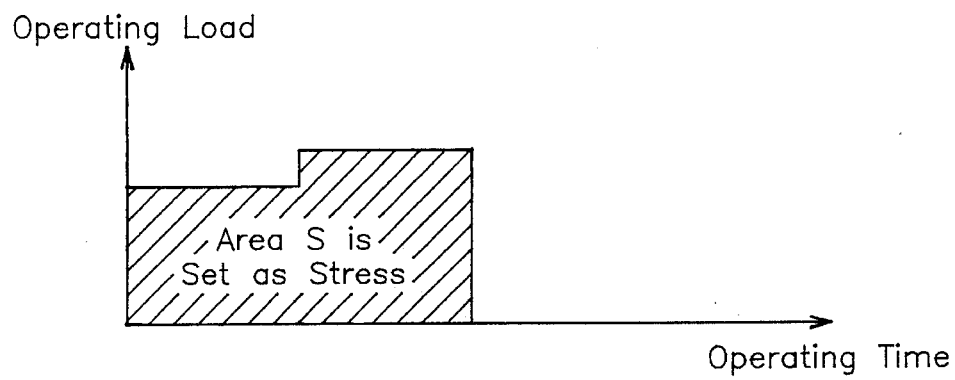
Fig.11(a)  Fig.11(b)
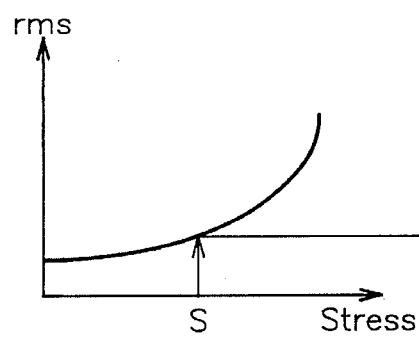
Stress–Attribute
Deterioration Model
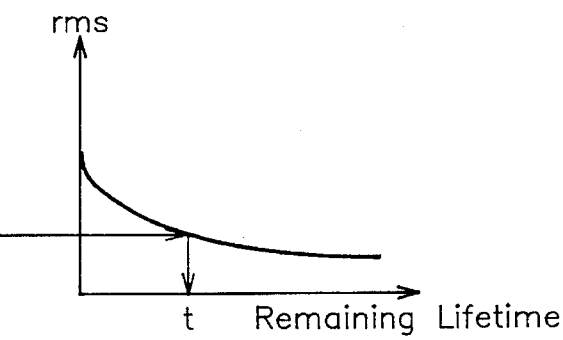
Attribute–Remaining Lifetime
Deterioration Model Stress–Attribute Deterioration Model Attribute–Remaining Lifetime Model

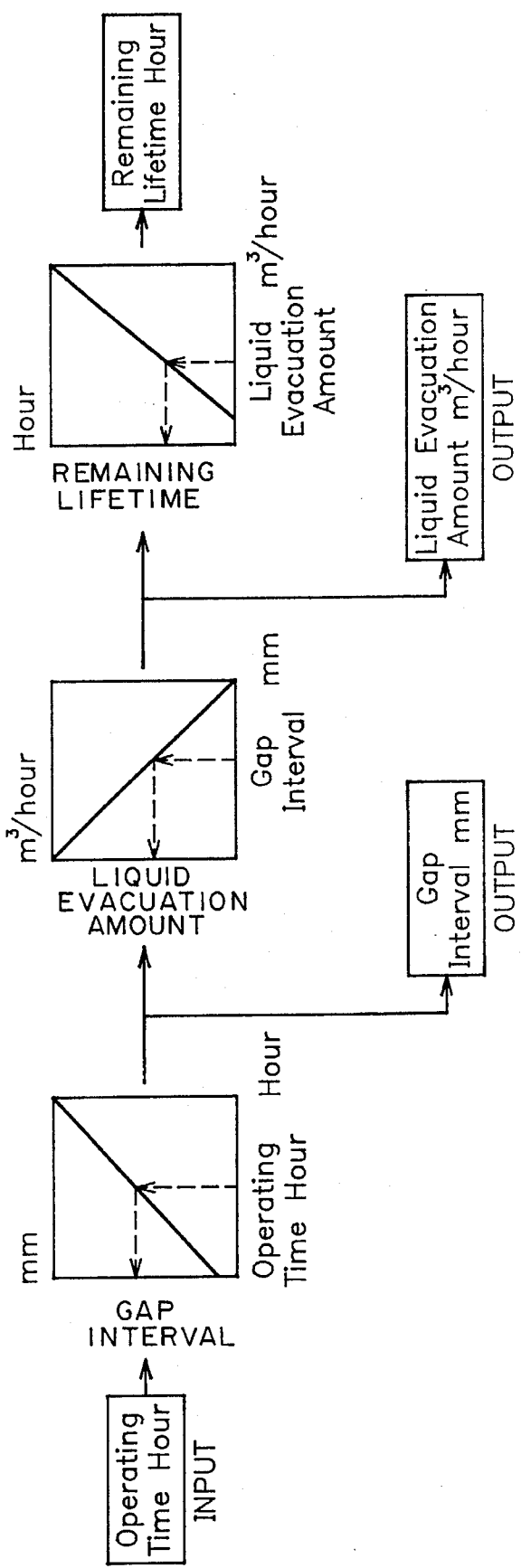

EQUIPMENT DIAGNOSIS SYSTEM

BACKGROUND OF THE INVENTION

1. Field of Invention

This invention relates to an equipment diagnosis system for diagnosing a variety of conditions of equipment used for different purposes; and more particularly, to such system for obtaining information on the conditions using a model of the conditions of the equipment to be diagnosed.

2. Description of Related Art

In different industrial fields, such as the chemical, iron, steel, etc, a variety of equipment are used and control thereof is automated in different ways. Many use a process control system centered about a computer which enables an operator to control or manage the variety of equipment from a central location. For example, the control or management can be of the production, operation, safety, maintenance, replacement, etc. For these purposes, equipment is diagnosed for its functional state, deterioration state, remaining life state, etc.

In the process control system, abnormality of a plant employing such system is caused by abnormality of equipment constituting such plant. If the abnormality of the equipment is diagnosed before abnormality shows up in the plant, suitable countermeasures can be taken in advance, and high reliability can be maintained for such plant, and maintenance costs can be reduced.

In order to accomplish the above, various method methods have been proposed involving abnormality diagnosis of equipment, such as disclosed in Japan Laid-Open Patent Applications SN 59-63,526, and 59-63,527. These methods are based on the processing of signals from the equipment to be diagnosed (called "diagnosis target equipment").

In conventional methods and apparatus, however, the functional state, deterioration state, life time state, etc, of each piece of equipment are varied in accordance with the condition of the equipment, such as type of equipment, condition of use, etc. Thus, accurate equipment diagnosis was not possible in the prior art. If the diagnosis cannot be made accurately for the equipment functional state, deterioration state, remaining life time state, etc, the user would often make a mistake, and for example, prematurely or too lately replace the equipment or institute maintenance procedures. For example, if the replacement or maintenance timing is delayed harmful damage to the equipment may result. On the other hand, if the replacement or maintenance is premature, the maintenance cost is increased.

SUMMARY OF THE INVENTION

Accordingly, an object of the invention is to overcome the aforementioned and other deficiencies and disadvantages of the prior art.

Another object is to provide an equipment diagnosis system for accurately and reliably diagnosing the functional state, the deterioration state, the remaining lifetime state, etc, for equipment,such as constituting a plant. The equipment may comprise dynamic equipment, such as pumps, compressors, valves, motor, etc and static equipment,such as reactors, distillation columns, pipes, measuring instruments, etc.

A further object is to provide an equipment diagnosis system for supplying an operator with information on what counter measures should be taken for a plant to reliably, accurately, and economically fulfill production plans, maintenance plans, etc, on the basis of information on the functional state, deterioration state, remaining life time state, etc of the concerned equipment.

The foregoing and other objections, features and advantages are attained by a first aspect of the invention which encompasses an equipment diagnosis system for diagnosing the functional state, the deterioration state, the remaining life time state, etc of equipment in a plant, comprising an equipment state model means for modelling the state of a diagnosis target equipment and for outputting at least one of the following information: functional state, deterioration state, remaining life time state, etc, for the diagnosis target equipment on the basis of the input information; stress information supply means for supplying the equipment state model means with at least information on the stress, which is applied to the diagnosis target equipment; comparison means for comparing information outputted from the equipment state model means with information obtained on the basis of an actual measurement and model correction means for correcting a parameter of the equipment state model means on the basis of comparison results outputted by said comparison means.

A second aspect of the invention encompasses an equipment diagnosis system for managing each equipment, for example, in a plant, comprises a deterioration model means for modelling the deterioration state of the equipment being diagnosed and for outputting information on the remaining life time of the equipment on the basis of input information; stress information supply means for supplying the deterioration model means with at least information on the stress being applied to the equipment; and simulation means which is supplied with the information on the remaining life time of the equipment from the deterioration model means and for supplying the deterioration model means with virtual stress information in accordance with the production plan or the maintenance plan to perform simulation, whereby the operational state of the diagnosis target equipment is altered on the basis of the information on the remaining life time obtained by the simulation means.

BRIEF DESCRIPTION OF THE DRAWINGS

FIG. 9 is a table depicting the relationship between bearing deterioration and causes.

FIG. 10 is a graph depicting the case where stress information is quantified by stress information supply means.

FIGS. 11(a) and 11(b) are graphs depicting a part of the deterioration model portion 1 of FIG. 7.

FIGS. 15(a)–15(c) are block diagrams depicting exemplary plurality of deterioration modules constituting the deterioration model portion.

DETAILED DESCRIPTION OF THE PREFERRED EMBODIMENTS

Figure 1:
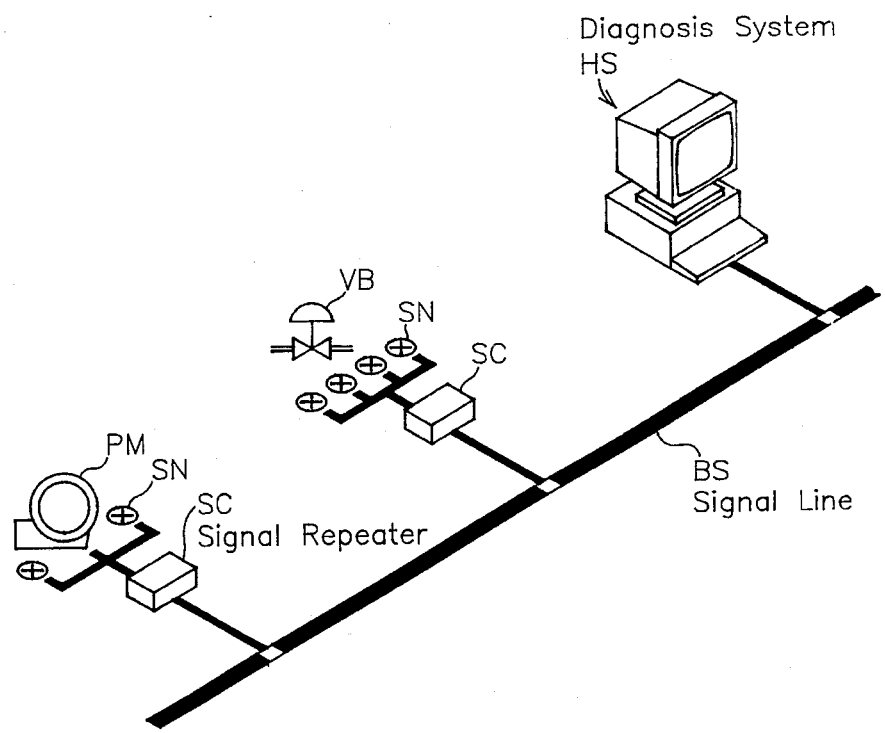
FIG. 1 is a conceptual diagram depicting an illustrative embodiment of the invention.

FIG. 1 shows an exemplary equipment diagnosis system of the invention comprising a valve VB, which is an equipment constituting a plant, and a pump PM which is another equipment constituting the plant. All of the equipment are targeted for equipment diagnosis, that is serve as the "diagnosis target equipment". Various kinds of sensors SN are provided at suitable locations on each equipment and serve to detect information on stress applied to the diagnosis target equipment. The diagnosis equipment may comprise dynamic equipment, such as valves, pumps, arc, and static equipment, such as heat exchangers, distillation columns, etc. The sensors SN may comprise vibration sensors, temperature sensors, thickness sensors, acoustic emission (AE) sensors, and the like.

When the diagnosis target equipment is one that involves fluid, such as a valve, a flow meter, and the like, for example, a sensor for detecting slurry concentration of fluid may be used. These sensors may be disposed inside or outside the respective equipment. Also, these sensors may be designed to detect signals in a non-contacting manner.

A signal repeater SC is provide for each equipment for converting a signal from each sensor SN to a normalized signal. A signal line BS is provided for transmiting a signal from each sensor SN through each signal repeater SC. A diagnosis system HS according to the invention, may be disposed in a measuring instrument room. Diagnosis system HS is supplied with signals from respective sensors SN through signal line BS and respective signal repeaters SC, and is designed to diagnose the functional state, the deterioration state, the remaining life time state, etc of each of the diagnosis target equipment, such as the valve, pump, etc, which may be considered to constitute a plant.

In this embodiment, the system is designed so that signal line BS is connected between diagnosis system HS and each sensor SN disposed in each equipment. However, the system may be designed so that signal line BS is omitted and the signal is transmitted from signal repeater SC to diagnosis system NS by wireless means. The system may also be designed so that a storage medium, such as an IC card, for example, for storing signals from the sensors SN, is disposed adjacent the equipment, and the diagnosis system is allowed to access the information in the storage medium.

Figure 2:
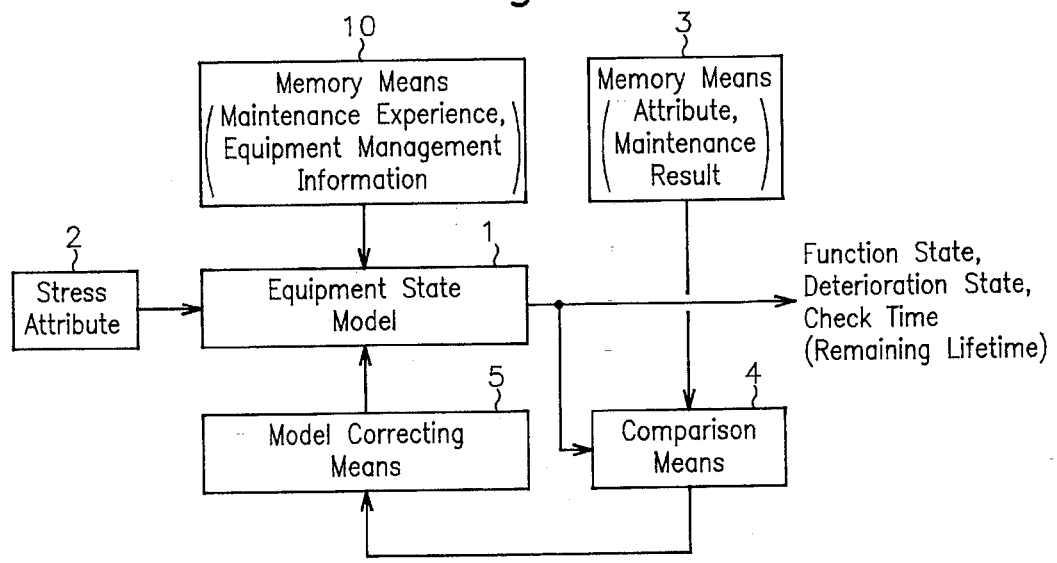
FIG. 2 is a block diagram depicting a basic function of a diagnosis system.

FIG. 2 shows a basic function of the diagnosis system HS of FIG. 1, wherein an equipment state model means or portion 1 is provided for modelling the state of a diagnosis target equipment, such as a valve, a pump, or the like, and for outputting at least one type of information, such as on the functional state, the deterioration state, and the remaining life time state, etc, on the basis of input information. The equipment state model portion 1 has a memory means 10 for holding a data base containing information which is based on the maintenance history or experience, the equipment management, etc for the equipment, and performs a prescribed operation on the basis of input information and information held in the data base, to thereby output information on the function state, the deterioration state, the remaining life time state, etc.

A stress information supply means 2 supplied the equipment state model portion 1 with at least information on stress which is applied to the diagnosis target equipment and on attribute of the equipment. The stress information supply means 2 has a signal processing function for converting signals from the respective sensors provided in the diagnosis target equipment to signals which can be treated by equipment state model portion 1.

A memory means 3 is provided for holding a data base containing an actual maintenance result of the diagnosis target equipment, attribute information of the equipment, etc. A comparison means 4 compares the information outputted from equipment state model portion 1 with the actual maintenance result of the diagnosis target equipment, which is read out from memory means 3. A model correction means 5 receives the comparison result from the comparison means 4 to correct parameters , etc, of the equipment state model portion 1, on the basis of the difference between the output information from equipment state model portion 1 and the actual maintenance result of the diagnosis target equipment.

Next, operation of the equipment diagnosis system HS will be described for the case where the diagnosis target equipment is a valve, which is used with fluid.

In this case, stress information supply means 2 is designed to supply an integration value of slurry concentration of fluid, that is for fluid flowing through a pipe in which a valve is disposed, to the equipment state model portion 1 as information on the stress on the diagnosis target equipment, in this case a valve. Also, equipment state model portion 1 is supplied with the integration value of the slurry concentration and outputs information on the remaining body thickness which is used as a factor for the equipment maintenance.

That is, representing the remaining body thickness by Y and representing the integration value of the slurry concentration by X, the equipment state model portion 1 is designed to perform the following equation:

$$Y = -aX^2 + b \qquad (1)$$

wherein $0 \leq X \leq 29$ (b/a), and a and b represent coefficients which are determined on the basis of management information and experience or history of the diagnosis target equipment.

More specifically, a represents a coefficient representing the degree to which the body thickness is reduced by the slurry, and is determined on the basis of past maintenance records, such as checking by the operator, exchange periods priorly experienced, etc. b represents a coefficient representing the initial value of body thickness, and is determined on the basis of equipment management information, etc.

Figure 3:
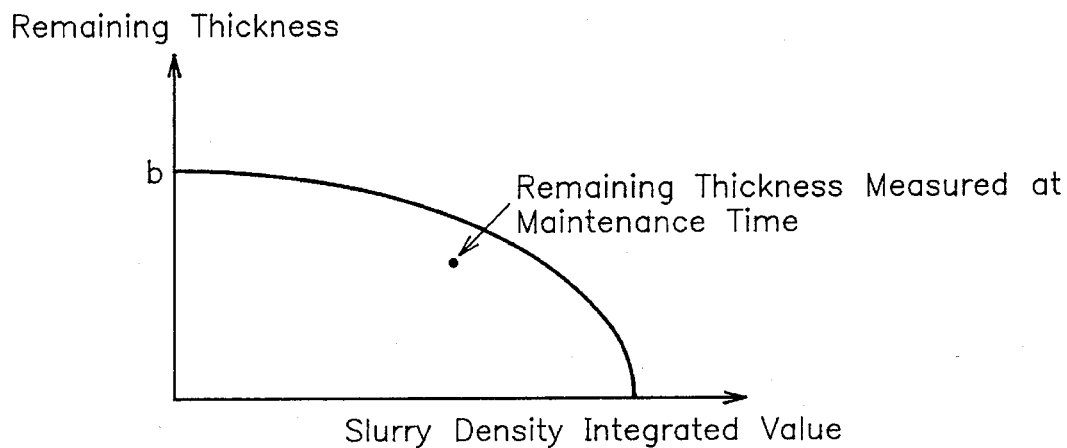
FIG. 3 is a graph depicting the relationship between information to be supplied to an equipment state model portion and information to be outputted from the equipment state model portion.

FIG. 3 shows the relationship between the information on the integration value of slurry concentration (see X axis) supplied to equipment state model portion 1 and the information on the remaining body thickness (see Y axis) outputted from equipment state model portion 1.

Through calculation of equation (1), equipment state model portion 1 achieved the relationship shown in FIG. 3. Thus, the model portion 1 outputs a value close to the initial value b of the remaining body thickness when the integration value of the slurry concentration is small. Then, the model portion 1 outputs a value such that the remaining body thickness is more reduced as the integration value of the slurry concentration increases. Accordingly, by monitoring information on the remaining body thickness outputted from model portion 1, the exchange timing (i.e. time the value is replaced) of the valve can be determined at the time when the value of the remaining body thickness is reduced to a predetermined threshold value.

If each coefficient or parameter a,b of equation (1), which is first set in model portion 1, accurately reflects the state of the diagnosis target equipment, then, the information on remaining body thickness outputted from model portion 1 is also accurate. Accordingly, the valve exchange timing can be properly, accurately, and reliably determined. However, if the parameter a or b does not accurately reflect the state of the diagnosis target equipment, then, the information on the remaining body thickness outputted from model portion 1 is not reliable.

In the invention, comparison means 4 and model correction means 5 overcome the aforementioned problem. The operation of means 4 and 5 will now be described. Comparison means 4 compares the information outputted from model portion 1 with a maintenance result which is actually measured at the time of maintenance of the equipment, and then stored in memory means 3 (e.g. actually measured body thickness) to calculate the difference K therebetween and produce a comparison result. Model correction means 5 is supplied with the difference c from comparison means 4 to correct parameter (a or b) of model portion 1. In this embodiment, b in equation (1) is corrected to be (b–c).

As a result, equipment state model portion 1 is corrected to satisfy the following equation:

$$Y=-aX^2+(b-c) \qquad (2)$$

wherein $0 \leq X \leq \sqrt{[(b-c)/a]}$.

Figure 4:
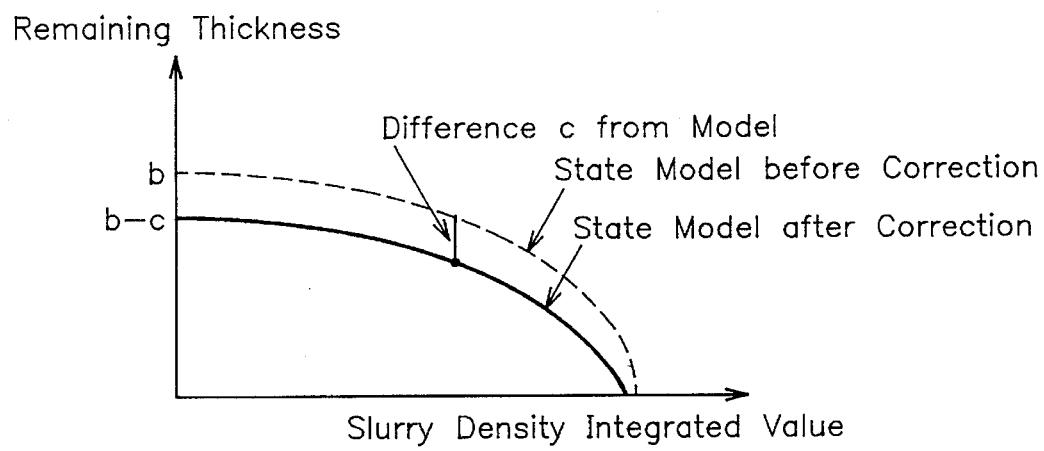
FIG. 4 is a graph depicting the relationship between the integration value of the slurry concentration to be supplied to the equipment state model portion and the remaining body thickness after correction.

FIG. 4 shows the relationship between the information on integration value of slurry concentration (see X-axis) supplied to the corrected equipment state model portion 1 and the information on remaining body thickness (see Y-axis) outputted from model portion 1.

As shown in FIG. 4, the equipment state model portion 1 is corrected to be shifted by an amount corresponding to the difference c, so that it is changed from a pre-correction state indicated by the broken line to a post-correction state indicated by the solid line. Thus, accurate information on the functional state, deterioration state, remaining life time state, etc, is outputted from model portion 1.

The correction of the internal construction of model portion 1 may be performed on the basis of one maintenance result, or of multiple maintenance results, such as every time a new maintenance result is obtained. Furthermore, several maintenance results may be plotted on a graph having an X-Y plane and the internal construction of the model portion 1 may be reconstructed by applying a least square approximation, that is, the model portion 1 may be reconstructed so that the square of the distance error is minimized.

Figure 5:
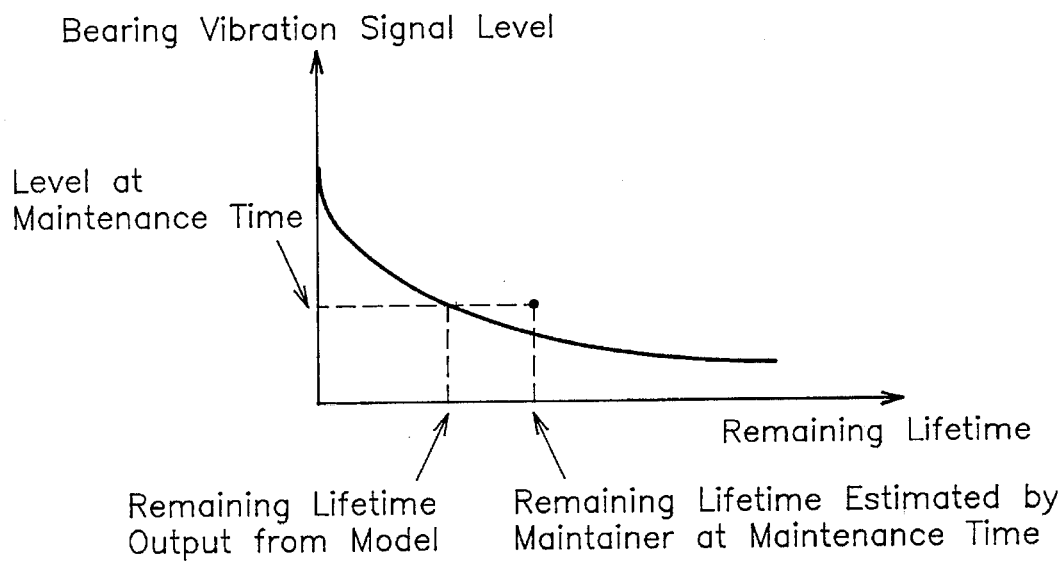
FIG. 5 is a graph depicting the relationship between the information to be supplied to the equipment state model portion and the information outputted from the equipment state model portion when an equipment to be diagnosed comprises a bearing.

FIG. 5 shows the relationship between the information supplied to the model portion 1 and the information outputted from the model portion 1 when the diagnosis target equipment has a bearing portion. In this case, stress information supply means 2 supplies model portion 1 with a vibration signal of the bearing portion as information on stress applied on the diagnosis target equipment. Equipment state model portion 1 is supplied with the vibration signal, and outputs information on the remaining life time of the equipment which is important for maintenance of the equipment.

That is, using Y to represent the level of vibration signal of a rotational bearing portion, that is the level of the vibration frequency signal, and using X to represent the remaining life time of the bearing portion, equipment state model portion 1 is designed to satisfy the following:

$$Y=\alpha(X-a)^2+b \qquad (3)$$

wherein $0 \leq X \leq a$, and $\alpha$, a, and b represent coefficients or parameters which are determined on the basis of management experience or history and management information of the equipment.

In this embodiment, these coefficients are determined on the basis of such an attribute that the level of the vibration signal is small when the remaining life time of the bearing is long, and the level of the vibration signal increases as the remaining life time is shortened.

Through the calculation of equation (3), model portion 1 achieves the relationship shown by the block line of FIG. 5. When the level of the vibration signal is small, model portion 1 outputs information representing the remaining life time which is long. On the other hand, as the level of the vibration signal increases, the model portion 1 outputs information representing the remaining life time as being shortened. Accordingly, by monitoring the information representing the remaining life time outputted from model portion 1, the exchange timing of the bearing can be accurately and reliably determined at the time when the value of the information reaches a predetermined value.

In this embodiment, comparison means 4 compares the remaining life time information outputted from model portion 1 with the maintenance result which is actually measured at the time the equipment is maintained and stored in memory 3. The remaining life time is determined on the basis of an abrasion state or the like by a maintenance inspector means or by a human operator. The comparison means then calculates the difference c between the remaining life time information and the maintenance results. Model correction means 5 is supplied with difference c from comparison means 4 to correct the parameters or coefficients of model portion 1. In this embodiment the coefficients Or parameters $\alpha$, and b in equation (3) are corrected to $\alpha 1$ and b1, for example.

As a result, model portion 1 is corrected to satisfy the following:

$$Y=\alpha 1(x-a)^2+b1 \qquad (4)$$

wherein $0 \leq X \leq a$.

Figure 6:
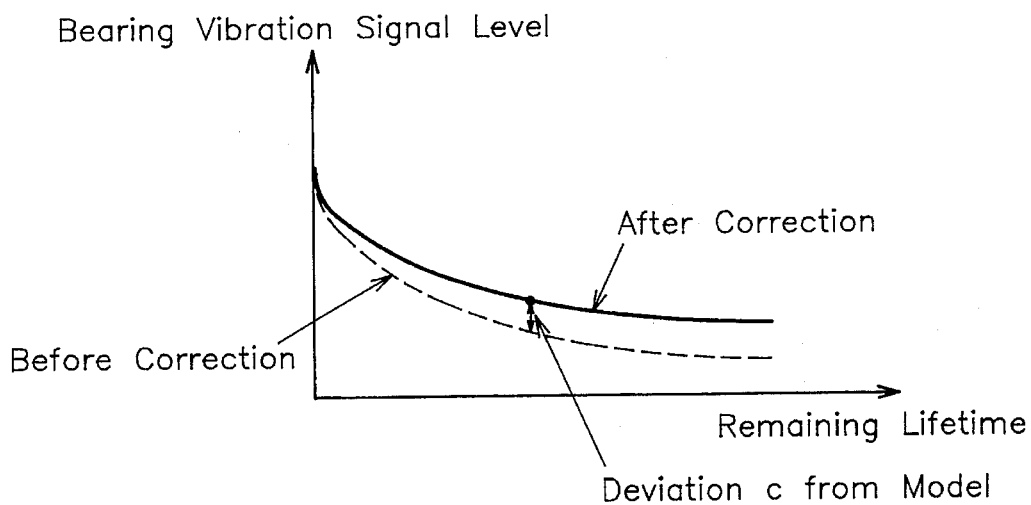
FIG. 6 is a graph depicting the relationship between the information to be supplied to the equipment state model portion and the information outputted from the equipment state model portion after correction.

FIG. 6 shows the relationship between the information supplied to corrected equipment state model portion 1 and the information outputted from model portion 1. Accordingly, the model portion 1 is corrected to be shifted by an amount corresponding to difference c, that is, it is shifted from a pre-correction state as indicated by the broken line to a post-correction state as indicated by the solid line.

In the above embodiment, there is no description of the processing of the output information from model portion 1. This information may be displayed with a display means, such as a CRT or the like, in such a manner that the human operator can easily understand the diagnosis results. For example, the display can be in graph form to represent deterioration estimation, or in graphic form to represent an alarm display, etc.

According to the invention, the internal construction of the equipment state model portion 1 is corrected on the basis of the actual maintenance results on the diagnosis target equipment. Accordingly, the internal construction of the equipment state model portion 1 can be optimized so that accurate diagnosis results can be obtained.

Figure 7:
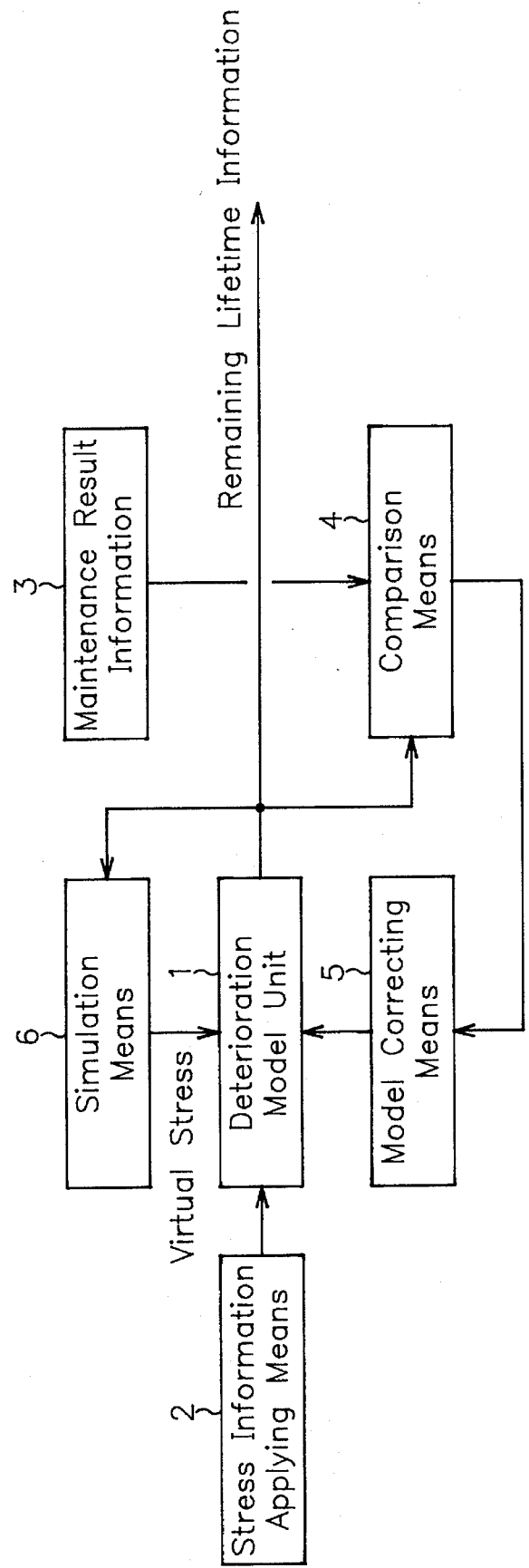
FIG. 7 is a block diagram depicting another illustrative embodiment of the invention.

FIG. 7 shows another illustrative embodiment of the invention, wherein a deterioration model for a diagnosis target equipment is used as a model, and is designed to have a simulation function on the basis of an input virtual stress, so that the remaining life time of the equipment can be readily, accurately, and economically managed. That is, when it is determined by equipment diagnosis result, that the remaining life time of a diagnosis target equipment can not be continued until the next scheduled maintenance time, the maintenance time is advanced so that the old equipment is exchanged for a new one. In this case, the plant must be stopped to perform equipment maintenance or replacement. Thus, the production plans, and maintenance plans, involving estimated maintenance cost, personnel schedules, etc, may be upset or schedules of delivery, etc, may be delayed.

The instant embodiment improves the equipment diagnosis system and solves the above problems, and enables the operator to obtain appropriate information so that countermeasures can be taken at a suitable time as regards remaining life time of the equipment, production plans, scheduled maintenance plans, etc.

FIG. 7 shows a deterioration model portion 1 for modelling the deterioration state of an equipment, such as a valve, a pump, or the like, which is a management target equipment, and for outputting the information on remaining life time of the equipment on the basis of the applied stress information. Deterioration model portion 1 holds a data base, comprising information on a maintenance experience or history, equipment management, etc, for the equipment, and performs a prescribed calculation between the supplied stress information and the information of the data base, to determine the deterioration of the diagnosis target equipment and output the information on the remaining life time of the equipment.

A stress information supply means 2 is provided for supplying deterioration model portion 1 with the information on stress applied to the diagnosis target equipment and attribute information of the equipment. Stress information supply means 2 has a signal conversion processing function for converting signals from various sensors, provided in the diagnosis target equipment, to signals which can be treated by deterioration model portion 1.

A memory means 3 is provide for storing maintenance result information which is obtained every time maintenance is performed. A comparison means 4 compares the information on remaining life time of the equipment outputted from model portion 1 with the maintenance result information read out from memory means 3.

A model correction means 5 is provided for correcting parameters of the model portion 1. When the maintenance result information, of the diagnosis target equipment, representing that the current state is deviated from a pre-estimated state, model correction means 5 functions to correct the parameters of deterioration model portion 1 so that the deviation is extinguished or reduced.

A simulation means 6 is supplied with the information on remaining life time outputted from the model portion 1 and outputs virtual stress information to the model portion 1 in accordance with at least one of the production plans and the maintenance plans, so that simulation can be performed.

Figure 8:
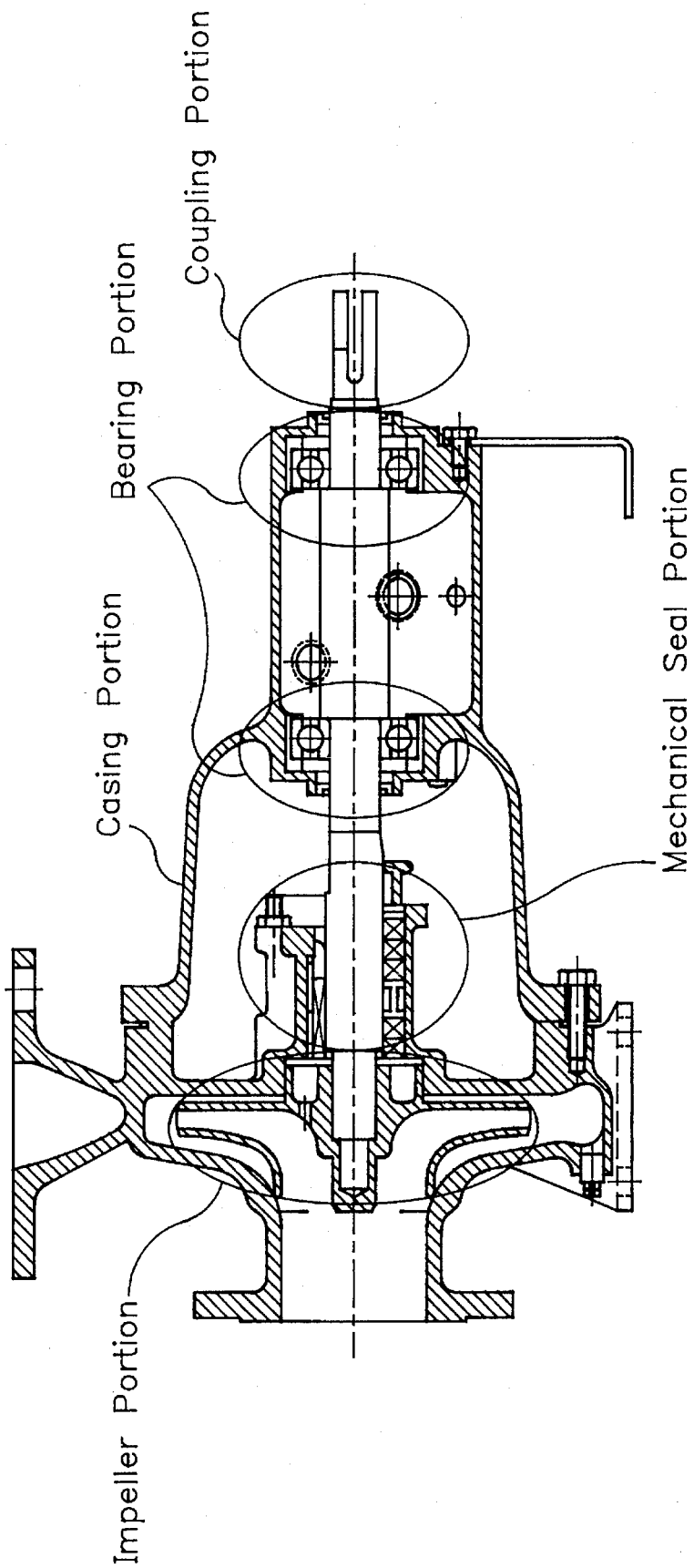
FIG. 8 is a cross-sectional view depicting a pump which is an example of a diagnosis target equipment.

The operation of the system of FIG. 7 will now be described for the case when the diagnosis target equipment is a pump, such as shown in FIG. 8. The pump comprises a casing portion, an impeller portion, a mechanical seal portion, a bearing portion, a coupling portion, etc. The deterioration model portion 1 (see FIG. 7) of the pump is obtained by modularizing the respective parts to obtain modules corresponding to the respective parts, and the body of the deterioration model portion is constructed by combining the respective modules.

When deterioration of a bearing is regarded as a factor which affects the life time of the bearing: deterioration due to fatigue is rolling fatigue, or fatigue exfoliation; deterioration due to overload or over interference is a crack or a break; deterioration due to failure of lubrication or overload is seizure; and deterioration due to failure of installation or failure of lubrication is galling. FIG. 9 shows in tablet form the above causes of bearing deterioration.

With respect to the bearing, failure of initialization, failure of lubrication, such as defective lubricant, driving load, operation time, etc, are stresses which serve as deterioration factors. Assuming that an initialization process such as alignment, filling, etc, and management of lubricant, are satisfactorily performed, then, rolling fatigue due to fatigue would be dominant factor affecting the life time of the bearing. Accordingly, in this case, the stress information supply means shown in FIG. 7 regards the rolling fatigue as an integration value which is obtained by integrating the driving load with respect to the operation time, and outputs the stress information on the basis of the integration value. If the initialization process on the bearing and management of lubricant are performed satisfactorily, then variation of stress based on the above factors can be substantially ignored.

FIG. 10 shows the relationship between operating or driving load (see Y axis) and the operation time (see X axis) when the stress information is quantified by stress information supply means 2. The stress information, i.e. in amounts, S applied on the bearing is obtained by integrating a driving load signal with respect to the operation time. The stress amount S corresponds to the area which is hatched in FIG. 10.

FIGS. 11(*a*) and 11(*b*) conceptually show a part of the deterioration model portion 1 (which is shown made of one module). A bearing is assumed to be the diagnosis target equipment. A model or module is supplied with stress information S from stress information supply means 2. The model includes a first graph showing the relationship between the stress information S (see X axis) and an attribute deterioration model or rms (see Y axis) as shown in FIG. 11(*a*). The model includes a second graph showing the relationship between the attribute deterioration mode or rms (see Y axis) and the remaining life time (see X axis) as shown in FIG. 11(*b*). The model outputs remaining life time information t from the input stress information S according to the respective graphs.

The attribute deterioration model uses, as an attribute value, for correcting itself, a root means square (rms) value , that is the effective value, level as shown in the following equation:

$$\text{rms} = \sqrt{(1/N)\int x(t)^2 \, dt} \tag{5}$$

wherein N represents a sampling time of vibration acceleration signal X.

According to equation (5), the integration of the square of the vibration acceleration signal is divided by the sampling time. Then, the square root of the result is calculated. In the first graph of FIG. 11(*a*), the relationship between the stress information S and the attribute deterioration model or rms can be constructed or corrected by measuring the actual rms value.

Moreover, the following equation (6) is used for the relationship between the attribute deterioration model or root means square (rms) and the remaining life time t:

$$rms = \alpha(1-a)^2 + b \quad (6)$$

wherein $0 \leq t \leq a$, and $\alpha$, a, b represent coefficients which are determined on the basis of management information and experience of history of the equipment. In this case, the coefficients $\alpha$, a and b are determined on the basis of such an attribute that the root mean square value is small when the remaining life time of the bearing is long, and the root means square value increases as the remaining life time of the bearing is shortened.

Each module constituting the deterioration model portion 1 is supplied with the corresponding stress information S to satisfy equations (5) and (6), thereby realizing the graphs of FIGS. 11(a) and 11(b). Accordingly, each module outputs information, representing that the remaining life time t is long when the stress S is small, and that the remaining life time is shortened as the stress S is increased.

Model portion 1 is constructed by combining a plurality of modules as described above. The model portion 1 synthetically determines the remaining life time information outputted from each module and outputs the information on remaining life time of the pump as a whole. In general when one of the modules of a diagnosis target equipment does not work, ie. the remaining life time is zero, the remaining life time of the equipment itself is regarded as being zero in most cases.

However, in this embodiment, it is assumed that the equipment itself can still be used even when the remaining life time information outputted from one of the plurality of modules is equal to zero or is reduced to a small value. This situation is identified through a simulation. If necessary, the driving load is reduced so that the equipment is further continually used. That is, the remaining life time of the equipment itself is determined according to the know-how (i.e. accumulated experience) of the remaining life time calculation for each diagnosis target equipment, according to an IF/THEN type rule. For the pump shown in FIG. 8, the remaining life time output from each module is represented as follows, and the remaining life time of the equipment itself is determined as follows.

Remaining life time outputted from the casing portion=T1

Remaining life time outputted from the impeller portion= T2

Remaining life time outputted from the mechanical seal portion=T3

Remaining life time outputted from the bearing portion= T4

Remaining life time outputted from the coupling portion= T5.

If T1<T2<T3<T4 (T5, and
If Min1 (T1, T2, T3, T4, T5)=T1, and
Min2 (T1, T2, T3, T4, T5)=T4,
Then, the remaining life time of the pump itself=T4
If Min1 (T1, T2, T3, T4, T5)=T1 and
Min2 (T1, T2, T3, T4, T5)=T2,
Then, the remaining life time of the pump itself=T2.
This is the remaining life time calculation method based on experience that the function of the pump can be continued even though the remaining life time of the casing portion is shortened, for example.

Simulation means 6 (of FIG. 7) is supplied with the remaining life time information of the diagnosis target equipment itself which is outputted from deterioration model portion 1. Simulation means 6 supplies a virtual stress to deterioration model portion 1 to execute simulation when the remaining life time is shorter than the next scheduled maintenance checking time.

Figure 12A:
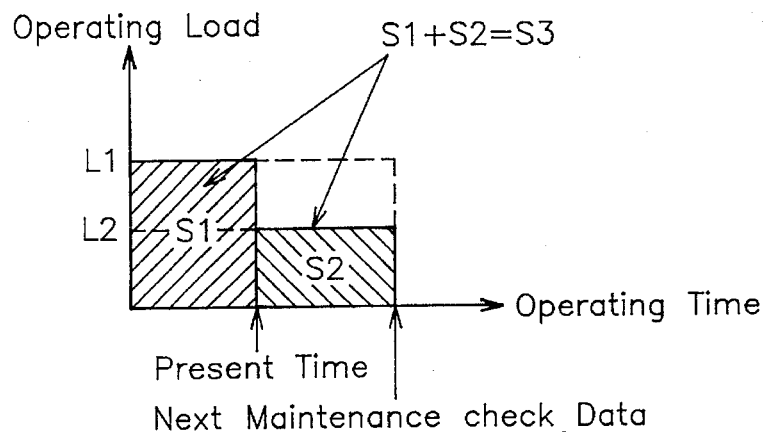
FIGS. 12(a)–12(c) are graphs depicting the operation of the simulation means.
Figure 12B:
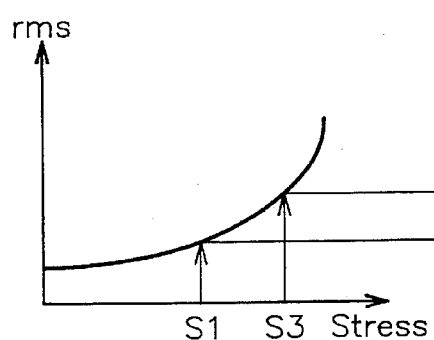
Figure 12C:
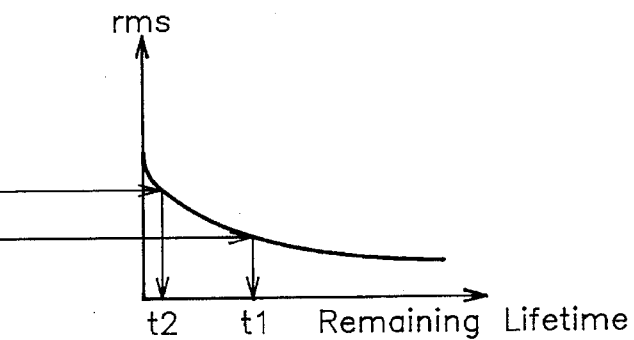

FIGS. 12(a)–12(c) are diagrams showing operation of simulation means 6, wherein FIG. 12(a) represents stress information S supplied to deterioration model portion 1. Simulation means 3 supplies deterioration model portion 1 with a stress amount S2, that is a stress amount based on the assumption that the diagnosis target equipment is driven with an operation load L2 until the next scheduled maintenance check, which is smaller than stress amount S1, which is the stress amount corresponding to the operation load L1, which has been supplied up to the present time, as a virtual stress, thereby performing simulation. In this case, total stress amount S3, which is given to deterioration model portion 1, is calculated as S1+S3.

As a result of the simulation, it is apparent from the graphs of FIGS. 12(a) and 12(c), that the remaining life time for the stress amount S3, which is supplied to model 1, is equal to time t2. Accordingly, if operation load L2, corresponding to stress amount S2, is set, the diagnosis equipment can be continually operated until the next scheduled maintenance. When it is found that the diagnosis target equipment is determined not to be continually usable until the next scheduled maintenance check, a different value is used as the virtual stress S2, and the same simulation is executed.

If the remaining life time t2, with which the equipment can be continually operated until the next scheduled maintenance check, is obtained through simulation, the operation state of the equipment is altered on the basis of the remaining life time information. The alteration of the operation state, various operation parameters, etc, are corrected so that the diagnosis target equipment is subsequently operated with operation load L2 corresponding to virtual stress S2.

The simulation means 6 is provided with the function of checking whether the following other conditions are satisfied before the operation load is altered to the new operation load L2:

(a) Whether the production plan is still satisfied after a periodic maintenance check when the operation load is altered, i.e. reduced, from L1 to L2.

(b) Whether the other devices or equipment suffers no effect when the operation load is altered, i.e. reduced, from L1 to L2. After the checking operation is performed, the process of altering the current operation load L1 to the new operation load L2.

Figure 13:
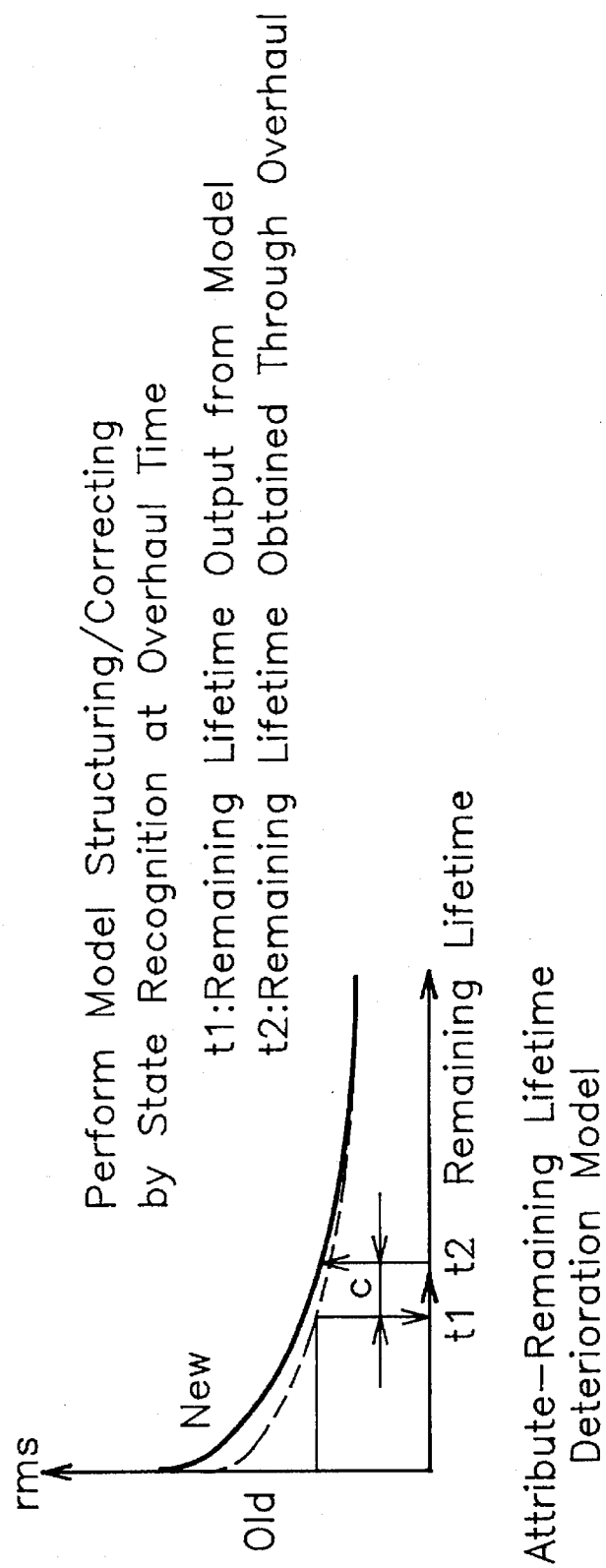
FIG. 13 is a graph depicting the operation of a model correcting means.

FIG. 13 shows the operation of the model correcting means 4 (of FIG. 7). When each coefficient or parameter of each equation used in deterioration model portion 1 accurately reflects the deterioration state of the diagnosis target equipment, the remaining life time information obtained from deterioration model portion 1 is accurate. Thus, no model correction model 5 is needed. On the other hand, when deterioration model portion 1 does not accurately reflect the deterioration state of the equipment, or the accuracy of its reflection to the deterioration state is gradually lowered with time, the remaining life time information becomes unreliable. Model correction means 5 (see FIG. 7) is provided to improve this point, and the operation thereof will be described with reference to FIG. 13.

Model correction means 5 compares the maintenance result information which is actually measured at the time of maintenance of the equipment and is stored in memory 3 (e.g. the remaining life time of a bearing which is determined on the basis of an abrasion state, or the like, by an operator) with the remaining life time information outputted from deterioration model portion 1 to calculate the difference c therebetween. Then, the model correction means corrects each coefficient or parameter of the deterioration model portion so that the difference c is reduced to zero or to a small value. In the embodiment, for example, the coefficients α and b in equation (6) are corrected to α1 and b1. As a result, deterioration model portion 1 is corrected to satisfy below equation (7).

$$rms = \alpha 1(t-a)^2 + b1 \quad (7)$$

wherein $0 \leq t \leq a$.

Furthermore, the graph of FIG. 13 is corrected to be shifted by an amount corresponding to the difference c. That is, the graph is shifted from the state before correction, i.e. precorrection state, as indicated by the broken line to the state indicated by the solid line.

Figure 14A:
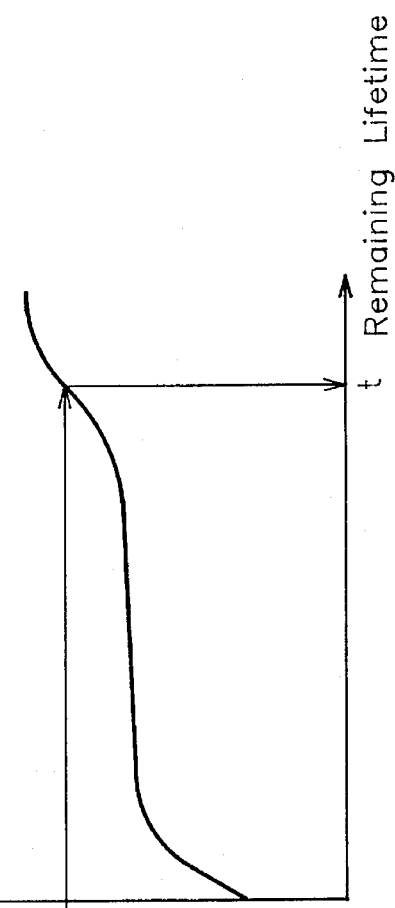
FIGS. 14(a) and 14(b) are graphs depicting another illustrative example of the deterioration model portion 1 of FIG. 7.
Figure 14B:
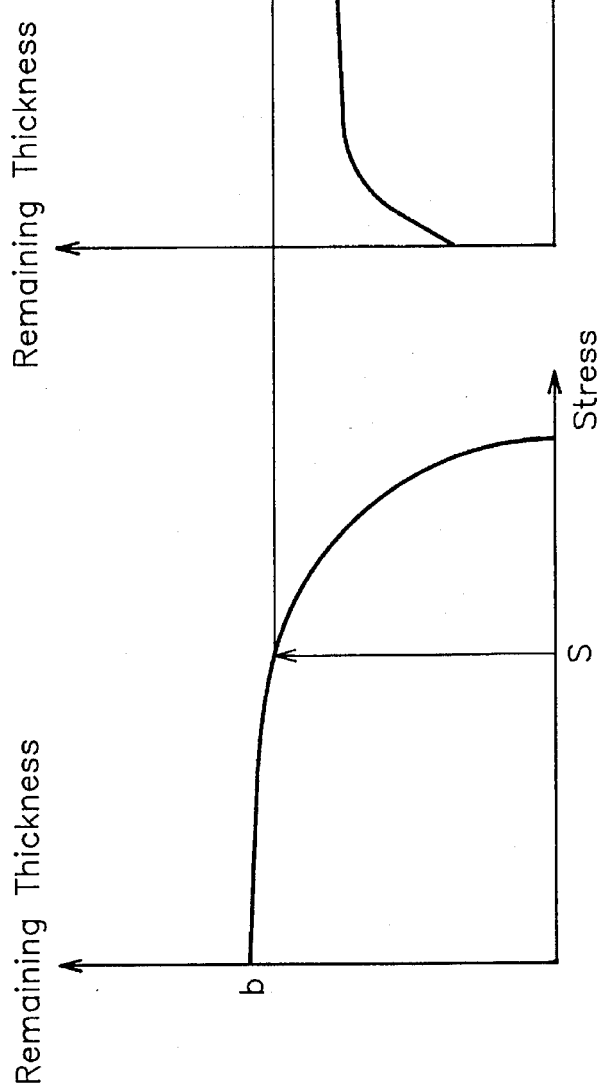

FIGS. 14(a) and 14(b) show another illustrative embodiment of the deterioration model portion 1, wherein a valve, which controls fluid, is assumed to be the diagnosis target equipment, and stress information supply means 2 supplies an integration value of the slurry concentration of fluid (e.g. fluid flowing through a pipe in which the valve is provided) as stress information. Deterioration model portion 1 is supplied with the integration value of the slurry concentration to calculate the remaining body thickness serving as a criterion for the equipment maintenance on the basis of the graph of FIG. 14(a), and output the remaining life time information t corresponding to the remaining body thickness on the basis of the graph of FIG. 14(b).

That is, in the graph of FIG. 14(a), representing the remaining body thickness (see Y axis) and the integration value of the slurry concentration, i.e. stress information (see X Axis), the remaining body thickness can be calculated according to the following equation (8).

$$Y = aX^2 + b \quad (8)$$

wherein $0 \leq X \leq \sqrt{(b/a)}$, and a and b represent coefficients which are determined on the basis of management information and experience or history of the valve. Specifically, a represents a coefficient which indicates the degree in which the body thickness is reduced by the slurry, and is determined on the basis of past maintenance records, e.g. checking manually, reviewing exchange periods, etc. b represents a coefficient representing the initial value of body thickness, and is determined on the basis of management information and the like.

Deterioration model portion 1 performs each calculation to produce the graphs of 14(a) and 14(b). That is, when the integration value of the slurry concentration or stress value is small, the remaining body thickness is near to the initial value. Thus, the deterioration model portion 1 outputs information representing that the remaining life time is long. On the other hand, as the integration value of the slurry concentration or stress value increases, the remaining body thickness is reduced. Thus, the deterioration model portion 1 outputs information representing that the remaining life time is shortened.

When the deterioration model portion represents a value, model correction means 5 compares the maintenance result which is actually measured when the valve is maintained, for example, the actual remaining body thickness, with the remaining life time information outputted from deterioration model portion 1 to calculate the difference c therebetween, and corrects the coefficient b in equation (8) to be (b-c). As a result, deterioration model portion 1 is corrected to satisfy the following equation.

$$Y = -aX^2 + (b-c) \quad (9)$$

wherein $0 \leq X \leq \sqrt{[(b-c)/a]}$.

FIGS. 15(a)–15(c) are functional block diagrams showing a deterioration module which constitutes the deterioration model portion 1, wherein the model portion 1 is constructed of a plurality of deterioration modules, each of which is provided for each of a plurality of parts constituting a diagnosis target equipment. In this case, the diagnosis target equipment is a pump, such as shown in FIG. 8, and a deterioration module which is representative of a casing portion, for example, is shown in FIG. 15.

The deterioration module is supplied with information which is related to the operation time of the pump, and outputs the remaining life time information on the basis of the operation time.

That is, the module contains (a) a first graph representing the relationship between operation time information and gap information as shown in FIG. 15(a); (b) a second graph representing the relationship between the gap and a liquid evacuation amount as shown in FIG. 15(b); and (c) a third graph representing the relationship between the liquid evacuation amount and the remaining life time as shown in FIG. 15(c). The remaining life time information is outputted from the input operation time information.

In the pump shown in FIG. 8, with respect to a deterioration module which is representative of the coupling portion of the mechanical seal portion, the respective modules are also supplied with the operation time information, and output the remaining life time information of the represented portion. The remaining life time information outputted from the plurality of deterioration modules are collectively analyzed to determine the remaining life time of the pump itself.

In the embodiment, there is no description of the processing of the remaining life time information from the deterioration model portion 1. However, this information may be displayed in a display means, such as a CRT, and the like, and in such a manner that the remaining life time can be readily determined by the operator. For example, the data can be displayed in a chart representing the deterioration estimate, or in a graphic form representing an alarm display, or the like, etc. Furthermore, a guidance display, indicating a countermeasure to be taken, for example an indication of altering the operation load from L1 to L2, etc, may be made on the basis of the remaining life time information.

In the invention, the deterioration model is provided and virtual stress information is supplied thereto to perform simulation. Thus, on the basis of the simulation result, the operational load, etc, of the diagnosis target equipment can be adjusted suitably according to a preset plan, such as the production plan, the maintenance plan, etc, to perform equipment management and maintenance, and extend the remaining life time of the equipment. Accordingly, plant operation can be readily, reliably, efficiently, and economically performed along preset plans with safety.

The foregoing is illustrative of the principles of the invention. Numerous extensions and modifications thereof would be apparent to worker skilled in the art. All such extensions and modifications are to be considered to be within the spirit and scope of the invention.

What is claimed is:

1. An equipment diagnosis system for managing equipment, comprising:

a deterioration model portion for modelling a deterioration state of a management target equipment and for outputting information of remaining life time of said management target equipment on basis of input information;

stress information supply means for supplying said deterioration model portion with at least information on stress applied to said management target equipment; and simulation means which is supplied with remaining life time information from said deterioration model portion and for supplying said deterioration model portion with virtual stress information according to a selected plan, to perform simulation, whereby an operation state of said management target equipment is altered on basis of remaining life time information obtained by said simulation means.

2. The system of claim 1, further comprising model correction means for correcting a parameter of said deterioration model portion on basis of comparison between output information from said deterioration model portion and an actual maintenance result of said management target equipment.

3. The system of claim 1, wherein said deterioration model portion comprises a plurality of deterioration modules, each of which is provided for each of a plurality of parts constituting said management target equipment, and which collectively determine a plurality of remaining life time information outputted from said plurality of deterioration modules to output remaining life time information of said management target equipment, and wherein said stress information supply means supplies information on stress to at least one of said plurality of modules, and wherein said simulation means alters the stress information to be supplied to said plurality of deterioration modules.

4. The system of claim 1, wherein said deterioration model portion comprises a plurality of deterioration modules, each of which is provided for each of a plurality of parts constituting a management target equipment, and collectively determine a plurality of remaining life time information outputted from said plurality of deterioration modules to output remaining life time information of said management target equipment, and wherein one of said plurality of deterioration modules is supplied with information on operation time and outputs remaining lifetime information based on said operation time.

5. An equipment diagnosis system comprising:

an equipment state model means for preparing a model of a state of a diagnosis target equipment, and for producing output information of a condition of said diagnosis target equipment;

means for supplying information on desired criteria of said diagnosis target equipment to said equipment state model means;

stress information supply means for supplying to said equipment state model means information on stress applied to said diagnosis target equipment, so that said equipment state model, utilizing said information on said desired criteria, said information on stress, and said model, produces said output information;

comparison means for comparing said output information from said equipment state model means with information on actual measurement of said diagnosis target equipment to thereby produce a comparison result; and model correction means for receiving said comparison result from said comparison means and responsive thereto for correcting a parameter of said equipment state model means.

6. An equipment diagnosis system comprising:

an equipment state model portion for modelling a state of a diagnosis target equipment and for outputting information of a condition of said diagnosis target equipment to be diagnosed on the basis of input information;

stress information supply means for supplying said equipment state model portion with at least information on stress which is applied to said diagnosis target equipment;

comparison means for comparing information outputted from said equipment state model portion with information which is obtained on the basis of an actual measurement and for producing a comparison result; and model correction means for correcting a parameter of said equipment state model portion on the basis of said comparison result produced by said comparison means; wherein said diagnosis target equipment controls fluid, and wherein said stress information supply means supplies said equipment state model portion with an integration value of slurry concentration of said fluid as information which is related to stress applied to said diagnosis target equipment, and wherein said equipment state model portion is designed to satisfy the following equation:

$$Y=-aX^2+b$$

wherein $0 \leq X \leq \sqrt{(b/a)}$; Y represents remaining body thickness of said diagnosis target equipment; X represents an integration value of slurry concentration flowing through said diagnosis target equipment; and a and b represent coefficients which are determined on basis of management information and experience with said diagnosis target equipment.

7. An equipment diagnosis system comprising:

an equipment state model portion for modelling a state of a diagnosis target equipment and for outputting information of a condition of said diagnosis target equipment to be diagnosed on the basis of input information;

stress information supply means for supplying said equipment state model portion with at least information on stress which is applied to said diagnosis target equipment;

comparison means for comparing information outputted from said equipment state model portion with information which is obtained on the basis of an actual measurement and for producing a comparison result; and model correction means for correcting a parameter of said equipment state model portion on the basis of said comparison result produced by said comparison means; wherein said diagnosis target equipment comprises a rotating portion, wherein said stress information supply means supplies said diagnosis target equipment with a vibration signal as information representing stress, and wherein said equipment state model portion is designed to satisfy the following equation:

$$Y=\alpha(X-a)^2+b$$

wherein $0 \leq X \leq a$; Y represents level of vibration signal; X represents remaining life time of said diagnosis target equipment; and $\alpha$, a, and b represent coefficients which are determined on basis of management information and experience with said diagnosis target equipment.

8. An equipment diagnosis system for managing equipment, comprising:

a deterioration model portion for modelling a deterioration state of a management target equipment and for outputting information of a remaining life time of said management target equipment on basis of input information;

stress information supply means for supplying said deterioration model portion with at least information on stress applied to said management target equipment; and simulation means which is supplied with remaining life time information from said deterioration model portion and for supplying said deterioration model portion with virtual stress information according to a selected plan, to perform simulation, whereby an operation state of said management target equipment is altered on basis of remaining lifetime information obtained by said simulation means; wherein said simulation means comprises means for checking whether the following conditions are satisfied when alteration of an operation state is instructed on basis of simulation results: (a) whether a production plan is still satisfied even when a current value of an operation load of said management target equipment is altered to a new operation load value which is obtained on basis of a simulation result, and (b) whether other equipment are not affected when operation load is altered from said operation load value to a new operation load value; and means for notifying an operator that current operation load is altered from a current operation load value to a new operation load value after checking operation.

* * * * *